Patented Nov. 8, 1927.

1,648,510

UNITED STATES PATENT OFFICE.

SAMUEL E. SHEPPARD, OF ROCHESTER, NEW YORK, ASSIGNOR TO EASTMAN KODAK COMPANY, OF ROCHESTER, NEW YORK, A CORPORATION OF NEW YORK.

FLUORESCENT MATERIAL AND METHOD OF PREPARING SAME.

No Drawing.   Application filed February 2, 1926. Serial No. 85,581.

This invention relates to improvements in the material used as the active fluorescent agent in X-ray intensifying screens. A well known and undesirable characteristic of the salt principally used, calcium tungstate, is its tendency to give phosphorescence on exposure to X-rays as well as fluorescence. That is, it will continue to emit light, after the exciting rays have ceased. The degree of this fault varies with different batches of material. Various methods of preparing very pure tungstate to overcome this trouble have been described, but they are tedious, costly and uncertain. I have found that this phosphorescence, which is generally called "after-glow" or "lag", may be markedly reduced by incorporating a small amount of certain sulfur compounds in the calcium tungstate. The quantities necessary to reduce phosphorescence to an innocuous point are very small and do not appreciably affect or reduce the fluorescence.

Among the materials that are useful for this purpose I have found to be particularly efficient, as well as commercially practicable, any inorganic sulfur-containing body, where the sulfur is oxidizable, and particularly the sulfides of the alkali metals (including ammonium) and of the alkaline earth metals. Instances of such materials are sodium sulfide, calcium sulfide, sodium polysulfide, sodium thiosulfate ($Na_2S_2O_3$), sodium polythionate ($Na_2S_4O_6$), and the corresponding salts of the metals of the classes mentioned. I have found that sulfur compounds such as the sulfates, wherein the sulfur is not reactive, are ineffective for the purpose described.

One of the known methods of making calcium tungstate is by the fusion of calcium chloride and sodium tungstate at a temperature of the order of between 1800° and 2000° F. In this process, I add the sodium sulfide or other sulfur body before fusion and carry on the process in the usual way, quenching the fused mixture in water and washing it well.

A suitable quantity of the sodium sulfide is from .5 to 2. per cent based on the dry weight of the calcium tungstate produced. Smaller quantities than this may be used, producing effective repression of phosphorescence (equal to present standards) but not such complete elimination, while the addition of more serves no useful purpose. The optimum quantity will vary with different batches of material and must be controlled by test. The sulfur compound may also be mixed with the calcium tungstate after manufacture, and then the mixture fused.

The same sulfur compounds may be used in the similar treatment of and in the similar process of preparation of cadmium tungstate, or a mixture of calcium and cadmium tungstate, such as is used more especially for fluoroscopic screens for visual examination as distinguished from the intensifying screens of calcium tungstate used with photographic plates.

Having thus described my invention, what I claim as new and desire to secure by Letters Patent is:

1. A composition of matter in which has been incorporated a tungstate having high fluorescent properties when excited by X-rays and an inorganic body containing oxidizable sulfur.

2. A composition of matter in which has been incorporated a tungstate having high fluorescent properties when excited by X-rays and a sulfide of a metal of the group including the alkali metals and the alkaline earth metals.

3. A composition of matter in which has been incorporated a tungstate having high fluorescent properties when excited by X-rays and a sulfide of an alkali metal.

4. A composition of matter in which has been incorporated a tungstate having high fluorescent properties when excited by X-rays and a sulfide of a metal of the group including the alkali metals and the alkaline earth metals, the proportion of the sulfide to the tungstate being between .5 and 2. per cent.

5. A composition of matter for use in X-ray screens in which has been incorporated calcium tungstate and a sulfide of an alkali metal.

6. The method of reducing the phosphorescent properties of a highly fluorescent tungstate that comprises the incorporation therewith of an inorganic body containing oxidizable sulfur.

7. The method of reducing the phosphorescent properties of a highly fluorescent tungstate that comprises the incorporation therewith of a sulfide of a metal of the group including the alkali metals and the alkaline earth metals.

8. The method of reducing the phosphorescent properties of a highly fluorescent tungstate that comprises the incorporation therewith of a sulfide of an alkali metal.

9. The method of reducing the phosphorescent properties of calcium tungstate that comprises the incorporation therewith of a substance containing oxidizable sulfur.

10. The method of reducing the phosphorescent properties of calcium tungstate that comprises the incorporation therewith of a sulfide of an alkali metal.

Signed at Rochester, New York this 29th day of January 1926.

SAMUEL E. SHEPPARD.